Patented Oct. 20, 1936

2,058,183

UNITED STATES PATENT OFFICE 2,058,183

DYEING LEATHER

Emil Senn, Riehen, near Basel, Switzerland, assignor to the firm J. R. Geigy A. G., Basel, Switzerland No Drawing. Application November 9, 1934, Serial No. 752,379. In Germany November 18, 1933

4 Claims. (Cl. 8—5)

This invention is an improvement in or modification of that described in a U. S. patent application filed by same inventor under Ser. No. 752,189 on November 8, 1934. The specification of this latter application relates to the application of a certain group of acid monoazo-dyestuffs derived from α-naphthol for dyeing leather, especially chrome leather, throughout.

According to the present invention leather, especially chrome leather, can be through-dyed by using, instead of the dyestuffs used in the aforesaid specification, those monoazo-dyestuffs which are obtainable by coupling the diazo-compounds used for producing the dyestuffs of the aforesaid specification in an alkaline medium with a 1-hydroxy-8-aminonaphthalene-mono- or disulphonic acid in which a sulpho-group must be present in 5-position. Some members of this group of dyestuffs are named in the examples which follow.

Violet and blue azo-dyestuffs, which have hitherto been used for dyeing leather, such as naphthamine blue 2B from tetrazotized benzidine and K acid (Schultz Farbstofftabellen, 7th edition, No. 384) or Columbia violet R from tetrazotized benzidine and G acid (Schultz Farbstofftabellen, No. 395) are capable of dyeing chrome leather only superficially. In contrast thereto the dyestuffs used in accordance with the present invention penetrate deeply into the leather and in most cases they dye it completely through. Leather, especially chrome leather, which has been dyed in accordance with the invention has great advantages. Its section is dyed throughout so that undyed portions are not exposed by damage to the surface or by wear during use.

In carrying out the invention dyestuffs may be applied in the following manner:—

Dyeing prescription

The neutralized hides are dyed in the cask with 150–200 per cent of water at a temperature of 65° C. The cask is set in motion and a solution of the dyestuff is introduced through the hollow axle. After 45 minutes the fat liquor is added and the cask is then kept in motion for a further 45 minutes. In the case of particularly heavy hides the duration of the dyeing must be suitably prolonged. In general a quantity of dyestuff amounting to 1–2 per cent of the weight of the material suffices for producing powerful through dyeings.

The dyestuffs may be made by the usual general method, which is illustrated by the following examples, in which the parts are by weight:—

Example 1

155.5 parts of 1-dimethylamino-3-chloro-4-aminobenzene are diazotized in the usual manner by means of 280 parts of hydrochloric acid and 69 parts of sodium nitrite. The diazo-compound is introduced at 0–5° C. into a solution of 319 parts of 1-hydroxy-8-aminonaphthalene-3:5-disulphonic acid containing sufficient sodium carbonate to maintain an alkaline reaction throughout the coupling. The formation of the dyestuff is promoted by the addition of some pyridine. The dyestuff is isolated in the usual manner. It dyes leather pure red-violet and penetrates deeply into the interior of the hide.

Example 2

259 parts of 5-N-ethyloxyethylamino-2-aminobenzene-1-sulphonic acid are diazotized and the diazo solution is added while stirring to a solution of 319 parts of 1-hydroxy-8-aminonaphthalene-3:5-disulphonic acid to which has been added an excess of sodium carbonate. Pyridine may be added with advantage in order to accelerate the formation of the dyestuff. When formation of the dyestuff is finished it is salted out hot by means of 20 per cent of common salt. After stirring the reaction mixture for a long time the dyestuff precipitates in the form of small crystals having a metallic lustre. It dyes chrome leather, both on the surface and in the interior, deep blue.

Example 3

The procedure is as described in example 2 with the exception that 5-diethylamino-2-aminobenzene-1-sulphonic acid is used in place of 5-N-ethyloxyethylamino-2-amino-benzene-1-sulphonic acid. There is obtained a dyestuff which dyes chrome leather reddish-blue and penetrates deeply into the leather.

Example 4

217.5 parts of 4-chloro-2-amino-1-($\beta$: $\gamma$ dihydroxy)-propyloxybenzene are diazotized and the diazo-compound is coupled with 319 parts of 1-hydroxy-8-aminonaphthalene-3:5-disulphonic acid in a medium alkaline with sodium carbonate, while stirring. After the reaction mixture has been stirred for several hours the dyestuff which is formed is worked up in the usual manner. It is a beautiful crystalline powder which dyes chrome leather throughout red-violet.

Example 5

230 parts of 5-nitro-2-aminobenzene-1-sulphonic acid are diazotized in the usual manner and the diazo-solution is introduced at 0° C. into a solution of 319 parts of 1-hydroxy-8-aminonaphthalene-3: 5-disulphonic acid together with sufficient sodium carbonate to maintain an alkaline reaction throughout the coupling. The formation of dyestuff proceeds smoothly. When it is complete the dyestuff, which separates in beautiful crystals, is isolated by salting out and worked up. It dyes chrome leather throughout red-violet.

*Example 6*

230 parts of 5-ethylamino-2-aminobenzene-4-methyl-1-sulphonic acid are diazotized and the diazo-compound is coupled in presence of pyridine with 319 parts of 1-hydroxy-8-aminonaphthalene-3: 5-disulphonic acid in a solution alkaline with sodium carbonate. The dyestuff is worked up in the usual manner. It dyes chrome leather blue throughout.

*Example 7*

The procedure is as in Example 6 except that instead of 1-hydroxy-8-aminonaphthalene-3: 5-disulphonic acid there are used 239 parts of 1-hydroxy-8-aminonaphthalene-5-sulphonic acid. The dyestuff so obtained dyes a chrome leather hide grey-blue both on the surface and in the interior.

What I claim is:—

1. A process for dyeing leather, wherein the leather is dyed with a monoazo-dyestuff which is obtainable by combining a diazo-compound derived from a diamine of the following formula:

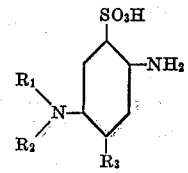

wherein $R_1$ stands for a member of the group consisting of alkyl and oxalkyl, $R_2$ and $R_3$ stand for a member of the group consisting of hydrogen and alkyl, in an alkaline medium with a 1-hydroxy - 8 - aminonaphthalene - mono - or disulphonic-acid containing a sulpho-group in 5-position.

2. A process for dyeing leather, wherein leather is dyed with the monoazo-dyestuff from diazotized 5-N-ethyloxyethylamino-2-aminobenzene-1-sulphonic acid and 1-hydroxy-8-aminonaphthalene-3: 5-disulphonic acid.

3. A process for dyeing leather, wherein leather is dyed with the monoazo-dyestuff from diazotized 5-diethylamino-2-aminobenzene-1-sulphonic acid and 1-hydroxy-8-aminonaphthalene-3: 5-disulphonic acid.

4. A process for dyeing leather, wherein leather is dyed with the monoazo-dyestuff from diazotized 5-ethyl-amino-2-aminobenzene-4-methyl-1-sulphonic acid and 1-hydroxy-8-amino-naphthalene-3: 5-disulphonic acid.

EMIL SENN.